(12) United States Patent
Wittig

(10) Patent No.: US 10,228,054 B1
(45) Date of Patent: Mar. 12, 2019

(54) DRIVE SYSTEM FOR MINIMIZING BACKLASH

(71) Applicant: Michael Wittig, Santa Clara, CA (US)

(72) Inventor: Michael Wittig, Santa Clara, CA (US)

( * ) Notice: Subject to any disclaimer, the term of this patent is extended or adjusted under 35 U.S.C. 154(b) by 0 days.

(21) Appl. No.: 15/602,101

(22) Filed: May 22, 2017

(51) Int. Cl.
*H02K 7/10* (2006.01)
*F16H 57/12* (2006.01)
*F16H 19/04* (2006.01)

(52) U.S. Cl.
CPC ............ *F16H 57/12* (2013.01); *F16H 19/04* (2013.01); *F16H 2057/127* (2013.01)

(58) Field of Classification Search
CPC ........ G05B 19/404; G05B 2219/41034; H02K 7/116
USPC ...... 310/75 R, 80, 83; 318/7–15, 45–48, 630
See application file for complete search history.

(56) References Cited

U.S. PATENT DOCUMENTS

| | | | | |
|---|---|---|---|---|
| 4,761,588 A | * | 8/1988 | Youcef-Toumi | G05B 19/39 318/46 |
| 5,134,346 A | * | 7/1992 | Schneider | B23H 7/26 318/8 |
| 5,729,100 A | * | 3/1998 | Rothstein | G05B 19/404 318/48 |
| 6,081,089 A | * | 6/2000 | Godon | B41J 19/78 318/560 |
| 6,580,244 B2 | * | 6/2003 | Tanaka | G05B 19/404 318/34 |
| 7,428,846 B2 | * | 9/2008 | Vukovic | G01D 5/04 318/625 |

* cited by examiner

*Primary Examiner* — Thanh Lam

(57) ABSTRACT

According to one aspect, a drive system includes a support structure, a first motor, a second motor, an output element, a first transmission, a second transmission, and an elastic element. The first motor comprises a first stator and a first rotor, the first stator of the first motor being coupled to the support structure. The second motor comprises a second stator and a second rotor, the second stator of the second motor being coupled to the support structure. The first transmission is coupled between the first rotor of the first motor and the output element. The second transmission is coupled between the second rotor of the second motor and the output element. The elastic element is coupled between the first rotor of the first motor and the second rotor of the second motor.

13 Claims, 11 Drawing Sheets

(PRIOR ART)

(PRIOR ART)

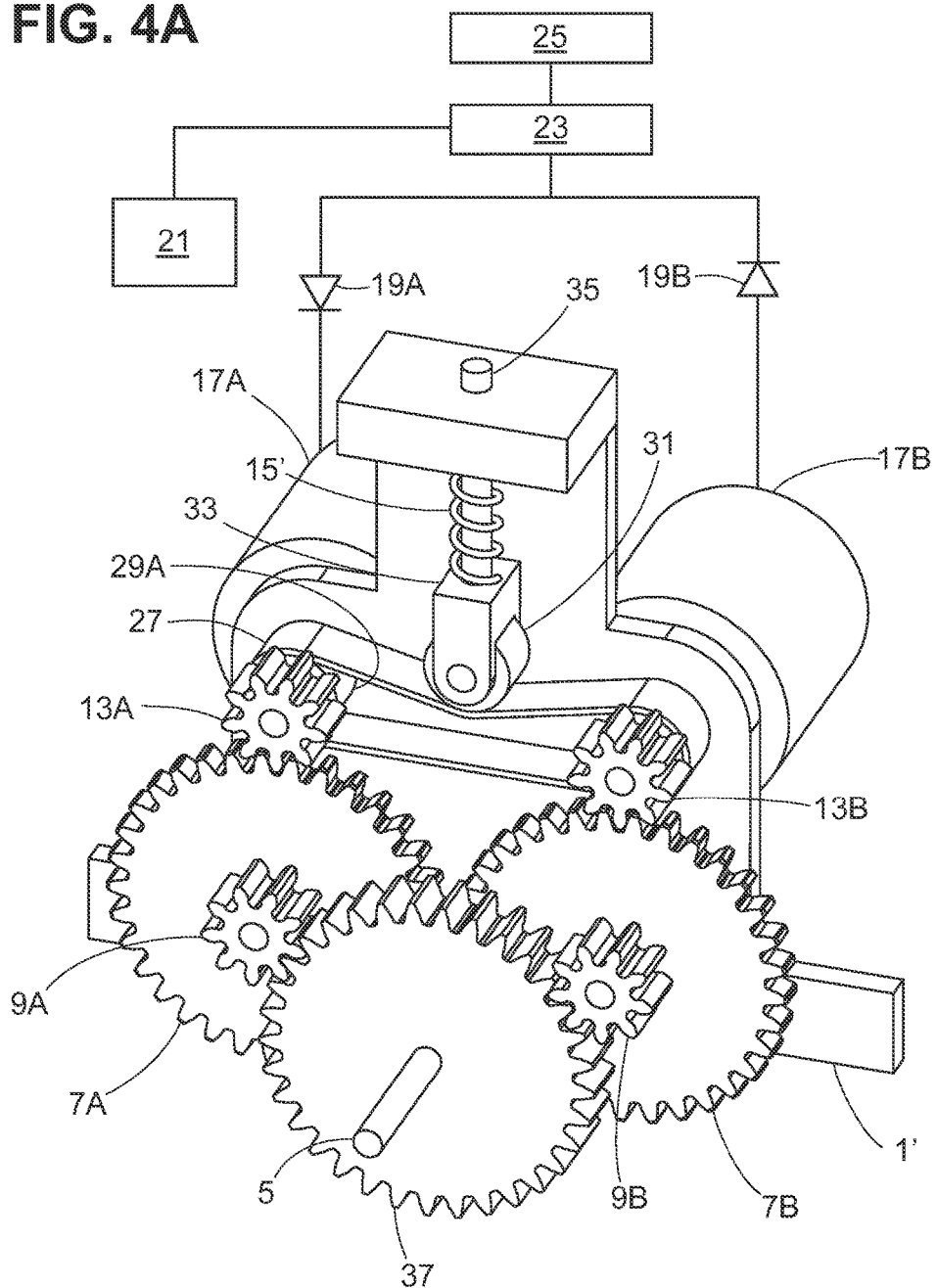

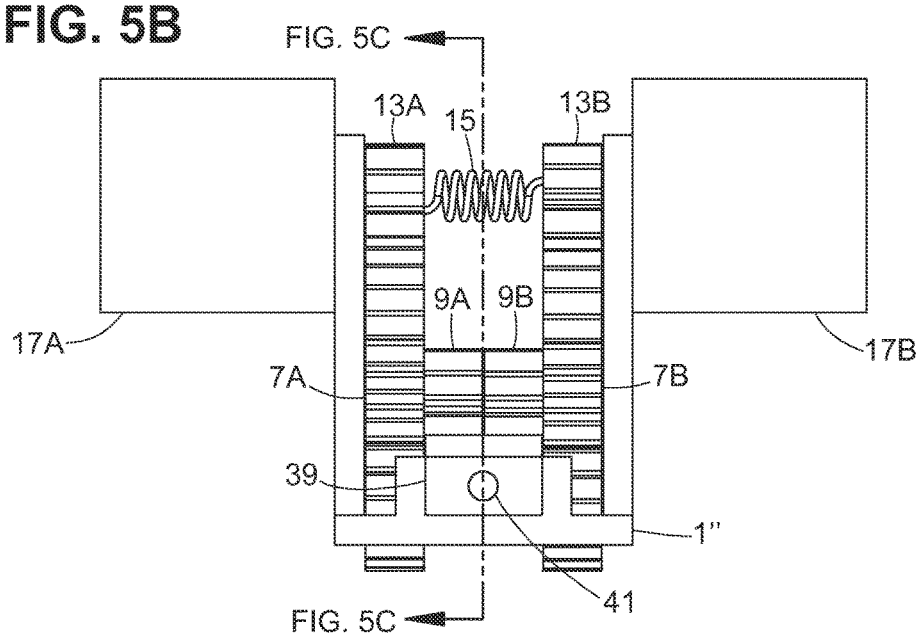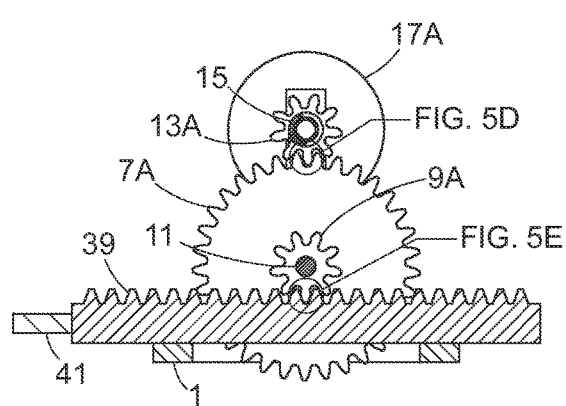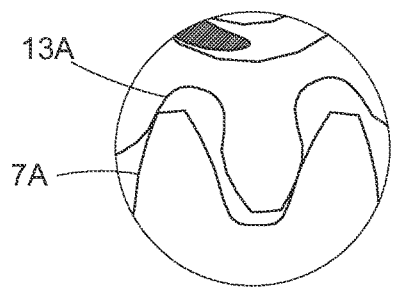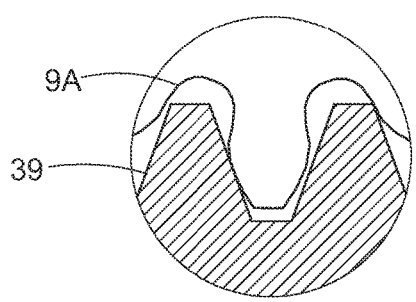

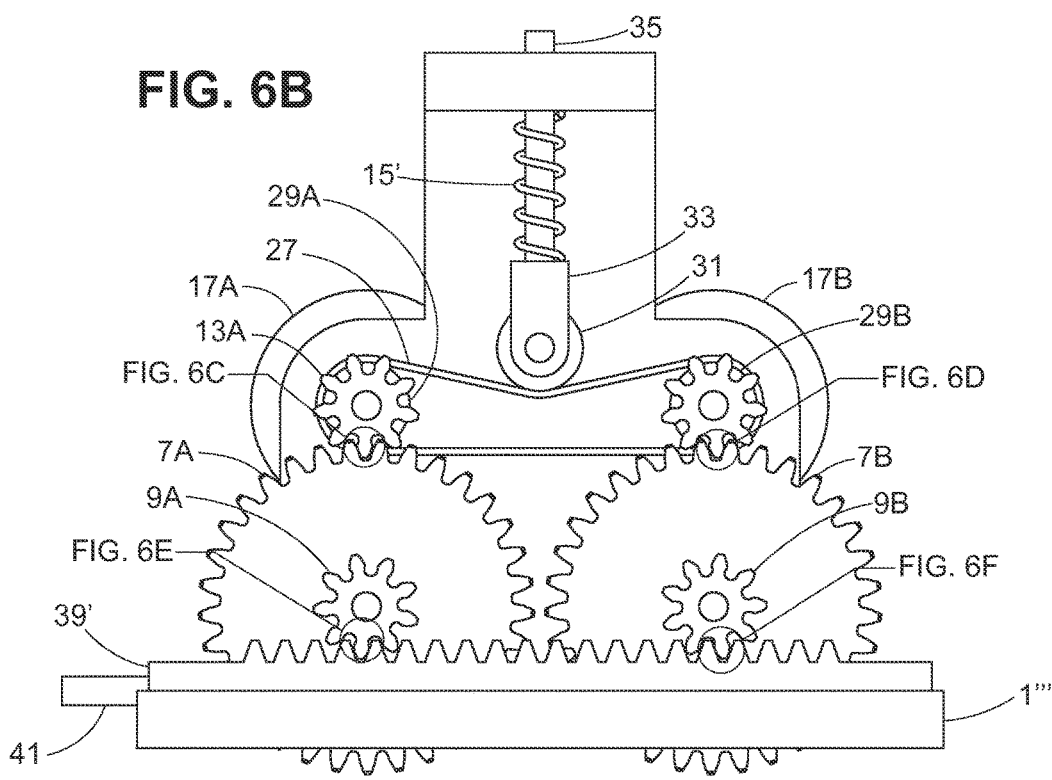
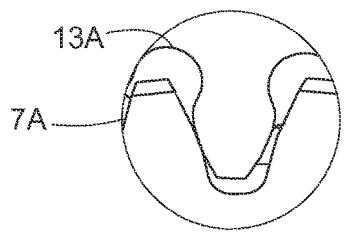
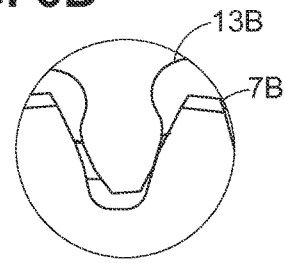
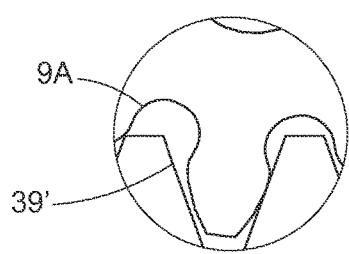
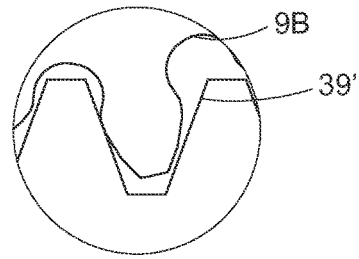

DRIVE SYSTEM FOR MINIMIZING BACKLASH

FIELD OF THE INVENTION

This invention relates to drive systems and particularly to drive systems that minimize backlash.

BACKGROUND

Conventional drive systems usually have backlash, meaning that the motor of the drive system can move without the output of the drive system moving. Backlash can make controlling the motion of the drive system's output difficult.

Various drive systems of been developed that minimize backlash. Perhaps the most common example of these drive systems is the harmonic drive. Unfortunately, harmonic drives are usually expensive and relatively large. Another drive system developed to minimize backlash incorporates so-called "anti-backlash" gears, as shown in FIG. 1. In an "anti-backlash" gear design, the gear is split into two halves that are coupled with springs. The springs are preloaded so that when the "anti-backlash" gear meshes with a regular gear, the two halves of the "anti-backlash" gear rotate relative to each other to take-up any backlash in the mesh. Unfortunately, this design may only be suitable for transmitting relatively light loads, as only one of the two halves may be fixed to a shaft. As a result, when the load is transmitted to the gear half that is not fixed to the shaft, it must be transmitted to the gear half that is fixed to the shaft through the springs. A load that exerts a higher force on the springs than their preload causes the backlash to reappear. Another drive system developed to minimize backlash is shown in FIG. 2. A first motor drives a rack in a desired direction, while a second motor drives the rack in the reverse direction but with less force than the first motor. The motors "fighting" each other provide a preload and take up backlash. Unfortunately, this design reduces the efficiency of the system due to the two motors constantly working against each other. Both motors may also need to be controlled simultaneously, increasing the complexity of the controller.

There is a need for a drive system that minimizes backlash while being cost-effective, efficient, and able to carry higher loads.

SUMMARY

According to one aspect, a drive system includes a support structure, a first motor, a second motor, an output element, a first transmission, a second transmission, and an elastic element. The first motor comprises a first stator and a first rotor, the first stator of the first motor being coupled to the support structure. The second motor comprises a second stator and a second rotor, the second stator of the second motor being coupled to the support structure. The first transmission is coupled between the first rotor of the first motor and the output element. The second transmission is coupled between the second rotor of the second motor and the output element. The elastic element is coupled between the first rotor of the first motor and the second rotor of the second motor.

According to another aspect, the drive system of the first embodiment has the elastic element preloaded to apply a first torque to the first rotor of the first motor and a second torque to the second rotor of the second motor. The second torque is equal to the first torque in magnitude but opposite in direction. The first torque applies a third torque to the output element through the first transmission. The second torque applies a fourth torque to the output element through the second transmission. The fourth torque is approximately equal to the third torque in magnitude but opposite in direction.

According to another aspect, the drive system of the second embodiment further includes a first diode, a second diode, and a circuit. The first diode has a first anode and a first cathode, the first cathode being coupled to the first motor. The second diode has a second anode and a second cathode, the second anode being coupled to the second motor. The circuit couples the first anode of the first diode and the second cathode of the second motor together.

According to yet another aspect, the drive system of the third embodiment further includes a single motor amplifier coupled to the circuit for supplying a controllable amount of power to the circuit. Both the first motor and the second motor are powered by the single motor amplifier.

According to another aspect, a drive system for minimizing backlash comprises a support structure, a motor, an output element, a first controllable damper, a second controllable damper, first and second transmissions, and an elastic element. The motor comprises a first stator and a first rotor, the first stator of the motor being coupled to the support structure. The output element is coupled to the support structure such that the output element can move relative to the support structure. The first controllable damper comprises a first portion and a second portion, the first portion being coupled to the first rotor. The second controllable damper comprises a third portion and a fourth portion, the third portion being coupled to the first rotor. The first transmission is coupled between the second portion of the first controllable damper and the output element. The second transmission is coupled between the fourth portion of the second controllable damper and the output element. The elastic element is coupled between the second portion of the first controllable damper and the fourth portion of the second controllable damper.

According to another aspect, the elastic element is preloaded to apply a first torque to the second portion of the first controllable damper and a second torque to the fourth portion of the second controllable damper, the second torque being equal to the first torque in magnitude but opposite in direction, the first torque applying a third torque to the output element through the first transmission, the second torque applying a fourth torque to the output element through the second transmission, the fourth torque being approximately equal to the third torque in magnitude but opposite in direction.

According to another aspect, the drive system further comprises a first diode having a first anode and a first cathode, the first cathode being coupled to the first controllable damper, a second diode having a second anode and a second cathode, the second anode coupled to the second controllable damper, and a circuit coupling the first anode of the first diode and the second cathode of the second diode together.

According to another aspect, the drive system further comprises a single amplifier coupled to the circuit for supplying a controllable amount of power to the circuit, whereby the first controllable damper, the second controllable damper, and the motor are powered by the single amplifier.

BRIEF DESCRIPTION OF THE DRAWINGS

The invention is further described by way of example with reference to the accompanying drawings wherein:

FIG. 4A is a schematic perspective view of a second embodiment having a rotary output.

FIG. 5B is a front view of the embodiment of FIG. 5A.

FIG. 5C is a cross-sectional view of the embodiment of FIG. 5A taken as indicated by the section line in FIG. 5B.

FIGS. 5D and 5E are detail views of portions of the cross-sectional view of FIG. 5C showing how the gear teeth mesh with each other at different locations.

FIG. 6B is a side view of the embodiment of FIG. 6A.

FIGS. 6C, 6D, 6E, and 6F are detail views of portions of the side view of FIG. 6B showing how the gear teeth mesh with each other at different locations.

Figure 1:
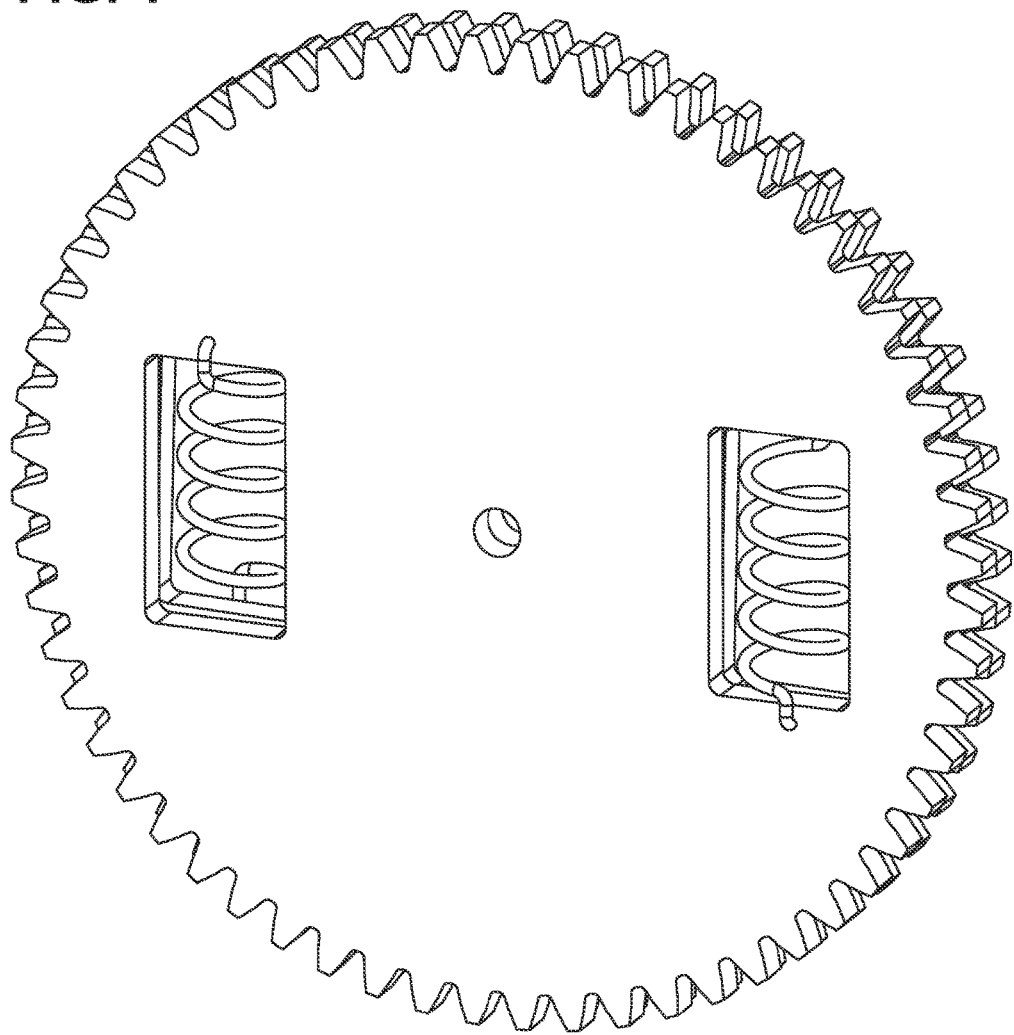
FIG. 1 is a perspective view of a prior-art "anti-backlash" gear.
Figure 2:
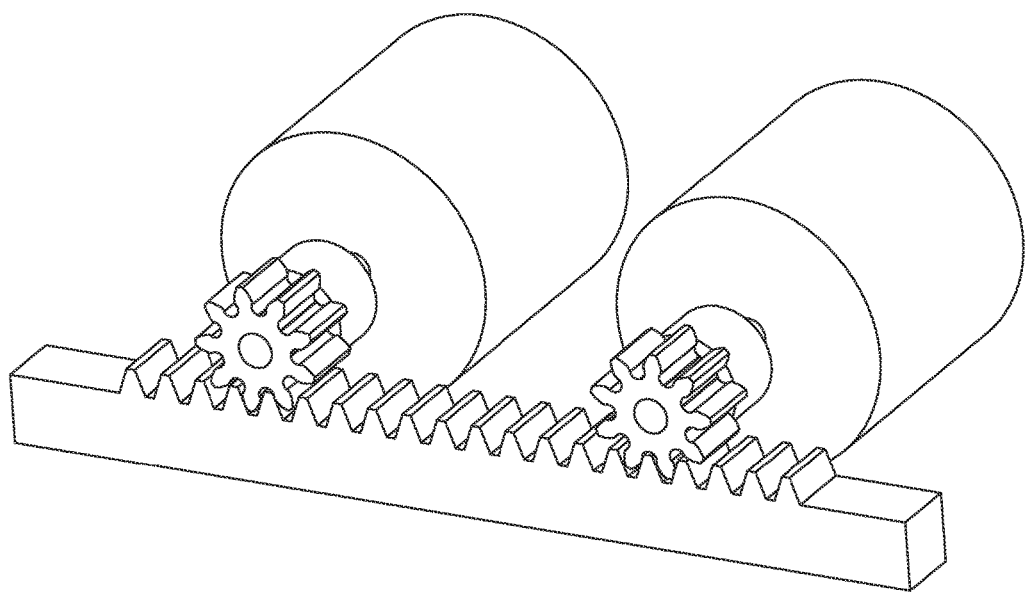
FIG. 2 is a perspective view of a prior-art drive system.

Note that a component with the same reference numeral as an earlier component with the exception that the reference numeral is followed by one or more apostrophes denotes a component with a similar function as that of the previously presented component with the same reference numeral, but of a different form.

DETAILED DESCRIPTION

Several example embodiments according to the present invention will now be described with reference to the figures. These example embodiments do not represent the full scope of the invention. Other embodiments, including those incorporating equivalent assemblies and components to those illustrated and described, will become apparent to those skilled in the art. It is intended that the full scope of the invention, which is defined by the claims, encompasses any and all such embodiments.

A First Exemplary Embodiment

Figure 3A:
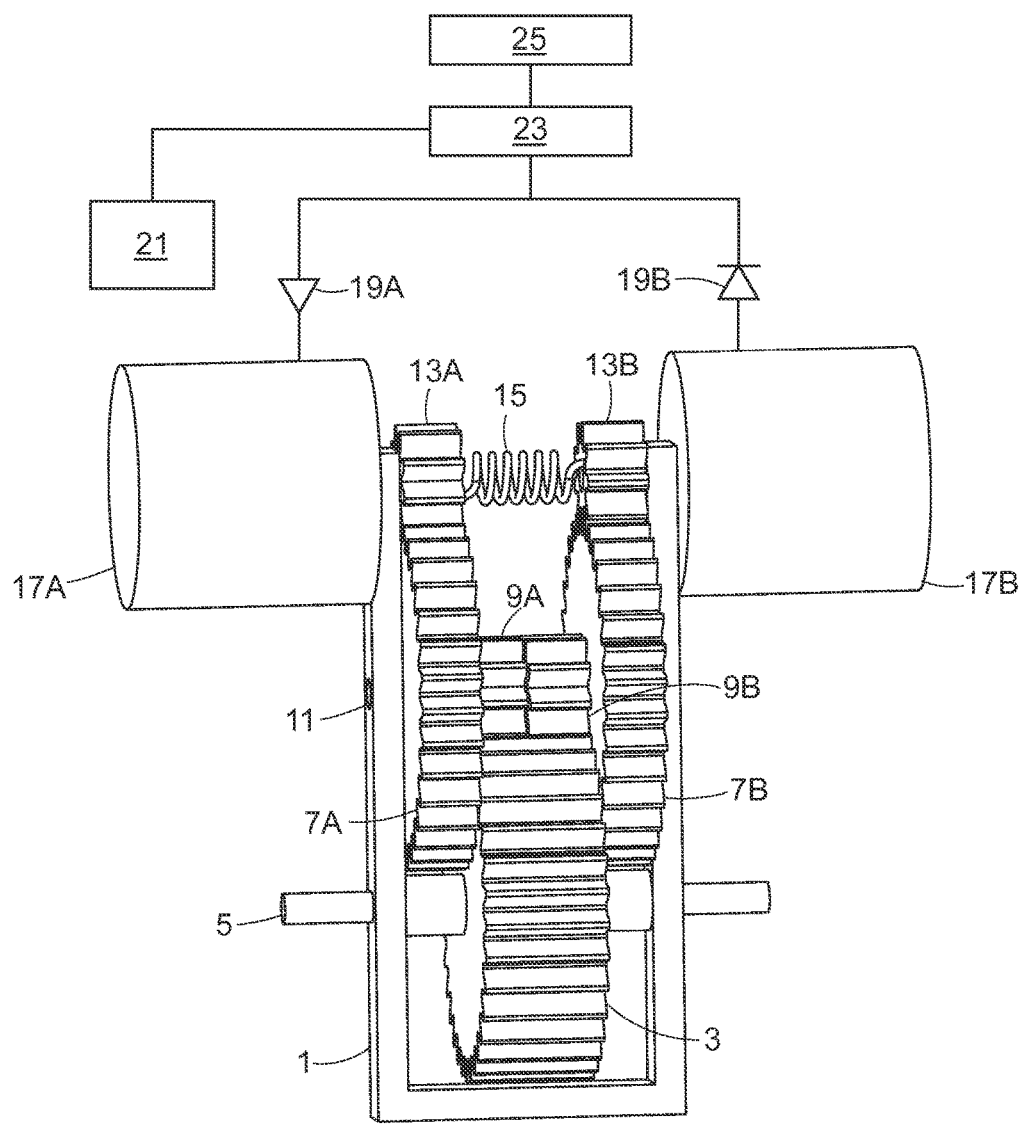
FIG. 3A is a schematic perspective view of a first embodiment having a rotary output.
Figure 3B:
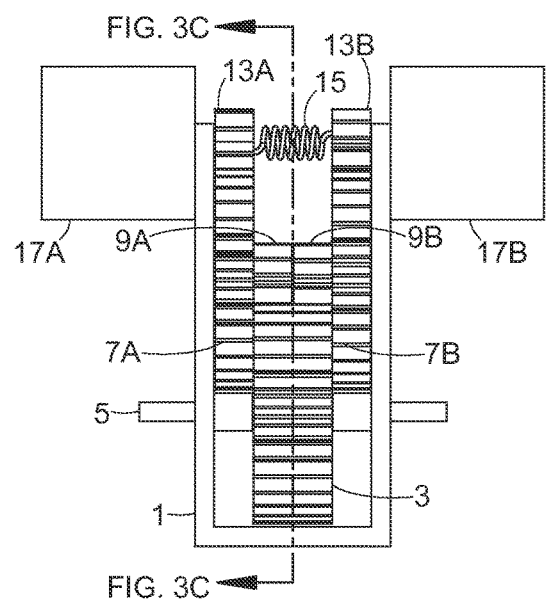
FIG. 3B is a front view of the embodiment of FIG. 3A.
Figure 3C:
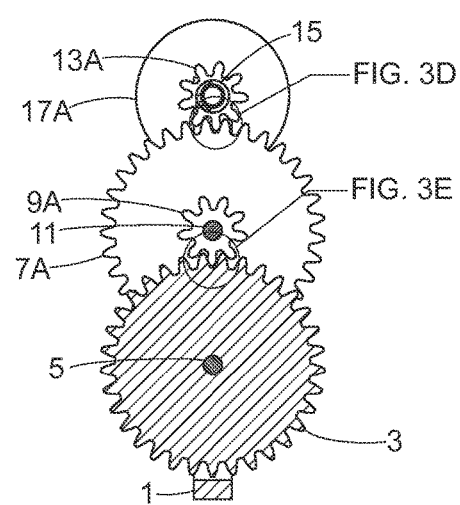
FIG. 3C is a cross-sectional view of the embodiment of FIG. 3A taken as indicated by the section line in FIG. 3B.
Figure 3D:
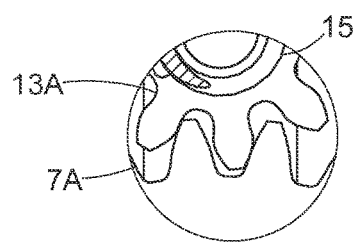
FIGS. 3D and 3E are detail views of portions of the cross-sectional view of FIG. 3C.
Figure 3E:
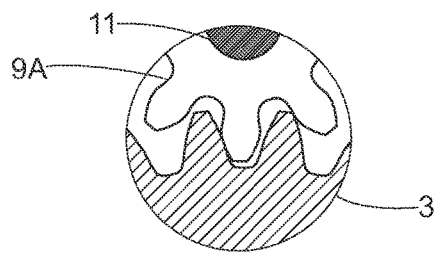

Referring to FIGS. 3A, 3B, 3C, 3D, and 3E, a first exemplary embodiment will now be described. The drive system illustrated in FIG. 3A comprises a support structure 1, an output in the form of an output shaft 5, motors 17A and 17B, an elastic element in the form of a spring 15, two gear transmissions coupling the motors to shaft 5, diodes 19A and 9B, a motor controller 23, a power source 25, and a position sensor 21. Motors 17A and 17B both comprise a stator and a rotor. The stator of each motor includes a housing fixed to support structure 1, while the rotor of each motor includes a rotating shaft which extends from the housing. The first gear transmission comprises a pinion gear 13A, a spur gear 7A, a pinion gear 9A, and an output spur gear 3. The second gear transmission comprises a pinion gear 13B, a spur gear 7B, a pinion gear 9B, and output spur gear 3 (which is part of both transmissions). Spur gears 7A and 7B freely rotate on a shaft 11. One end of spring 15 is fixed to pinion 13A, while the other end of spring 15 is fixed to pinion 13B. In this embodiment, spring 15 is a torsion spring that is preloaded or "wound up" to exert a torque on pinion 13A (and hence the rotor of motor 17A) as well as a torque equal in magnitude, though opposite in direction, on pinion 13B (and hence the rotor of motor 17B). Pinion 13A is preloaded by spring 15 to rotate counterclockwise to press against spur gear 7A, as shown in FIGS. 3C and 3D. As a result, spur gear 7A is preloaded to rotate clockwise by spring 15. Pinion gear 9A is fixed to spur gear 7A, and pinion gear 9B is similarly fixed to spur gear 7B. Therefore, as spur gear 7A rotates clockwise, pinion gear 9A also rotates clockwise to press against output spur gear 3, as shown in FIG. 3E, urging output spur gear 3 to turn counterclockwise. Spring 15 therefore acts to remove the backlash from the first gear transmission when the first gear transmission drives the output spur 3, and hence output shaft 5, to rotate in the counterclockwise direction (in FIG. 3C) of rotation of output spur 3. For example, if the rotor of motor 17A turns counterclockwise, pinion gear 13A is already in contact with spur gear 7A, so there is no backlash as long as pinion gear 13A turns counterclockwise. Similarly, pinion gear 9A is already in contact with output spur gear 3, so there is no backlash as long as pinion gear 9A turns clockwise. Therefore, in the first transmission, any backlash has been taken up by spring 15 as long as the rotor of motor 17A turns counterclockwise. Pinion gear 13B, spur gear 7B, and pinion gear 9B similarly carry a preload from spring 15, but in the reverse direction, urging output spur gear 3 to turn the opposite (clockwise) direction that pinion gear 13A, spur gear 7A, and pinion gear 9A are urging it to turn. Therefore, in the second transmission, any backlash has been taken up by spring 15 as long as the rotor of motor 17B turns in the opposite direction of the rotor of motor 17A, or clockwise relative to FIG. 3C.

As shown in FIG. 3A, diode 19A has its anode or positive terminal coupled to a circuit that also connects to motor controller 23 and the cathode or negative terminal of diode 19B. The cathode or negative terminal of diode 19A is coupled to motor 17A, while the anode or positive terminal of diode 19B is coupled to motor 17B. Therefore, when a positive electrical current flows from motor controller 23 into the circuit, it is directed into motor 17A. Likewise, when a negative electrical current flows from motor controller 23 into the circuit, it is directed into motor 17B. Motor 17A is configured in such a way that a positive electrical current flowing into motor 17A will cause the rotor of motor 17A (and thus pinion 13A) to turn counterclockwise (in FIG. 3C). Similarly, motor 17B is configured in such a way that a negative electrical current flowing into motor 17B will cause the rotor of motor 17B (and thus pinion 13B) to turn clockwise (relative to FIG. 3C). Therefore, when current from motor controller 23 is flowing in the positive direction, the rotor of motor 17A turns pinion 13A counterclockwise (relative to FIG. 3C) while motor 17B receives approximately no current due to the diodes 19A and 19B. As described earlier, when pinion 13A turns counterclockwise (relative to FIG. 3C), backlash between pinion gear 13A and spur gear 17A, as well as between pinion gear 9A and output spur gear 3, was taken up by spring 15, so no backlash is present as pinion 13A causes output spur gear 3

(and hence output shaft 5) to turn counterclockwise (relative to FIG. 3C). Similarly, when the current from motor controller 23 is flowing in the opposite (negative) direction, the rotor of motor 17B turns pinion 13B clockwise (relative to FIG. 3C) while motor 17A receives approximately no current, again due to diodes 19A and 19B. As described earlier, when pinion 13B turns clockwise (relative to FIG. 3C), backlash between pinion gear 13B and spur gear 17B, as well as between pinion gear 9B and output spur gear 3, was taken up by spring 15, so no backlash is present as pinion 13B causes output spur gear 3 and hence shaft 5 to turn clockwise (relative to FIG. 3C).

Motor controller 23 comprises a motor amplifier that varies the amount of power delivered to motors 17A and 17B, while position sensor 21 tracks the position of output shaft 5. Power source 25 supplies power to motor controller 23. In some embodiments, position sensor 21 may be used to provide a position signal to motor controller 23, which may use the position signal in a closed-loop control system for maintaining or moving output shaft 5 to a particular position. In other embodiments, motor controller 23 may use the current delivered to motors 17A and 17B in a closed-loop torque control system for maintaining or moving output shaft 5 with a particular torque.

A Second Exemplary Embodiment

Figure 4B:
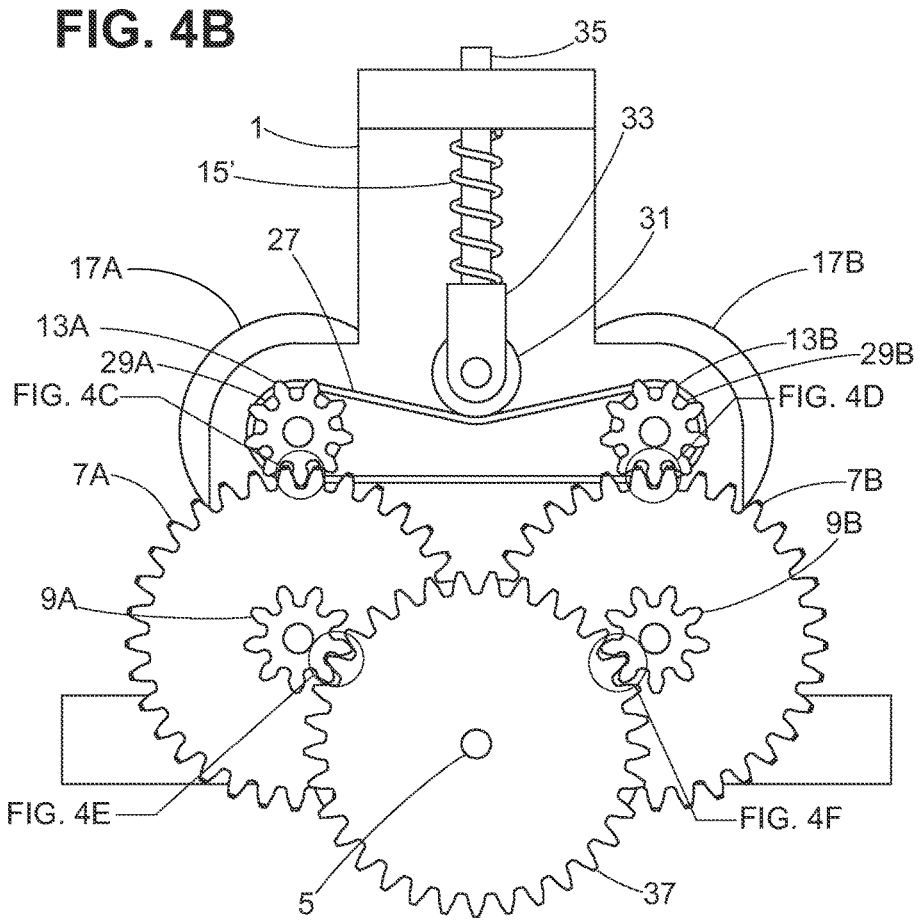
FIG. 4B is a front view of the embodiment of FIG. 4A.
Figure 4C:
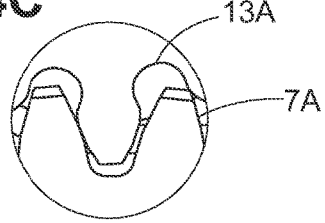
FIGS. 4C, 4D, 4E, and 4F are detail views of portions of the front view of FIG. 3C showing how gear teeth mesh with each other at different locations.
Figure 4D:
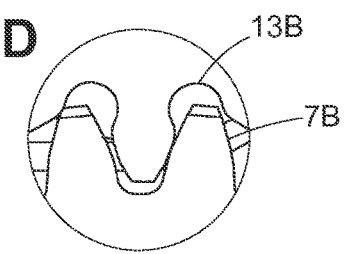
Figure 4E:
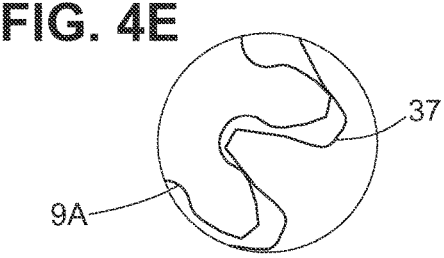
Figure 4F:
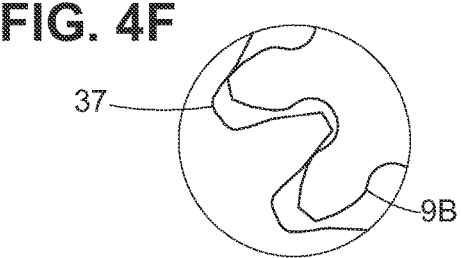

Referring to FIGS. 4A, 4B, 4C, 4D, 4E, and 4F, a second exemplary embodiment will now be described. The drive system illustrated in FIG. 4A comprises a support structure T, an output in the form of output shaft 5, motors 17A' and 17B', two transmissions coupling the motors to shaft 5, a preloading mechanism for preloading the two transmissions, diodes 19A and 9B, motor controller 23, power source 25, and position sensor 21. Motors 17A' and 17B' both comprise a stator and a rotor. The stator of each motor includes a housing fixed to support structure Y, while the rotor of each motor includes a rotating shaft which extends from the housing. The first transmission comprises pinion gear 13A, spur gear 7A, pinion gear 9A, and an output spur gear 37. The second transmission comprises pinion gear 13B, spur gear 7B, pinion gear 9B, and output spur gear 37 (which is part of both transmissions). Spur gears 7A and 7B freely rotate on a shaft 11. The preloading mechanism comprises timing pulleys 29A and 29B (visible on FIG. 4B), a timing belt 27, a wheel 31, a wheel support 33, a shaft 35, and an elastic element in the form of a spring 15'. Timing pulley 29A is fixed to pinion gear 29A, while timing pulley 29B is fixed to pinion gear 29B. Timing belt 27 meshes with timing pulleys 29A and 29B. Spring 15' and wheel 31 is supported by a shaft 35 via a wheel support 33. Spring 15' is a compression spring that presses wheel 31 against timing belt 27 via wheel support 33. Referring to FIG. 4B, as wheel 31 is pressed against timing belt 27, timing belt 27 causes timing pulley 29A to rotate clockwise. Since pinion gear 13A is fixed to pulley 29 A, gear 13A also rotates clockwise, pressing against spur gear 7 A as shown in FIG. 4C, which causes spur gear 7A to rotate counterclockwise. Since pinion gear 9A is fixed to spur gear 7A, it too is caused to rotate counterclockwise. Pinion gear 9A in turn urges output spur gear 37 to rotate clockwise, as shown in FIG. 4E. Similarly, as wheel 31 is pressed against timing belt 27, timing belt 27 causes timing pulley 29B to rotate counterclockwise. Since pinion gear 13B is fixed to pulley 29B, gear 13B also rotates counterclockwise, pressing against spur gear 7B as shown in FIG. 4D, which causes spur gear 7B to rotate clockwise. Since pinion gear 9B is fixed to spur gear 7B, it too is caused to rotate clockwise. Pinion gear 9B in turn urges output spur gear 37 to rotate counterclockwise, as shown in FIG. 4F. The preloading mechanism therefore removes the backlash between pinion gear 13A and spur gear 7A, the backlash between pinion gear 9A and output spur gear 37, the backlash between pinion gear 13B and spur gear 7B, and the backlash between pinion gear 9B and output spur gear 37.

As shown in FIG. 4A, diode 19A has its anode or positive terminal coupled to a circuit that also connects to motor controller 23 and the cathode or negative terminal of diode 19B. The cathode or negative terminal of diode 19A is coupled to motor 17A', while the anode or positive terminal of diode 19B is coupled to motor 17B'. Therefore, when a positive electrical current flows from motor controller 23 into the circuit, it is directed into motor 17A'. Likewise, when a negative electrical current flows from motor controller 23 into the circuit, it is directed into motor 17B'. Motor 17A' is configured in such a way that a positive electrical current flowing into motor 17A' will cause the rotor of motor 17A' (and thus pinion 13A) to turn clockwise (in FIG. 4B). Similarly, motor 17B' is configured in such a way that a negative electrical current flowing into motor 17B' will cause the rotor of motor 17B' (and thus pinion 13B) to turn counterclockwise (relative to FIG. 4B). Therefore, when current from motor controller 23 is flowing in the positive direction, the rotor of motor 17A' turns pinion 13A clockwise (relative to FIG. 4B) while motor 17B' receives approximately no current due to the diodes 19A and 19B. As described earlier, when pinion 13A turns clockwise (relative to FIG. 4B), backlash between pinion gear 13A and spur gear 7A, as well as between pinion gear 9 A and output spur gear 3, was taken up by spring 15' pressing tensioning wheel 31 on timing belt 27, so no backlash is present as pinion 13A causes output spur gear 3 (and hence output shaft 5) to turn clockwise (relative to FIG. 4B). Similarly, when the current from motor controller 23 is flowing in the opposite (negative) direction, the rotor of motor 17B' turns pinion 13B counterclockwise (relative to FIG. 4B) while motor 17A' receives approximately no current, again due to diodes 19A and 19B. As described earlier, when pinion 13B turns counterclockwise (relative to FIG. 4B), backlash between pinion gear 13B and spur gear 17B', as well as between pinion gear 9B and output spur gear 3, was taken up by spring 15', so no backlash is present as pinion 13B causes output spur gear 3 and hence shaft 5 to turn counterclockwise (relative to FIG. 4B).

Motor controller 23 comprises a motor amplifier that varies the amount of power delivered to motors 17A' and 17B', while position sensor 21 tracks the position of output shaft 5. Power source 25 supplies power to motor controller 23.

A Third Exemplary Embodiment

Figure 5A:
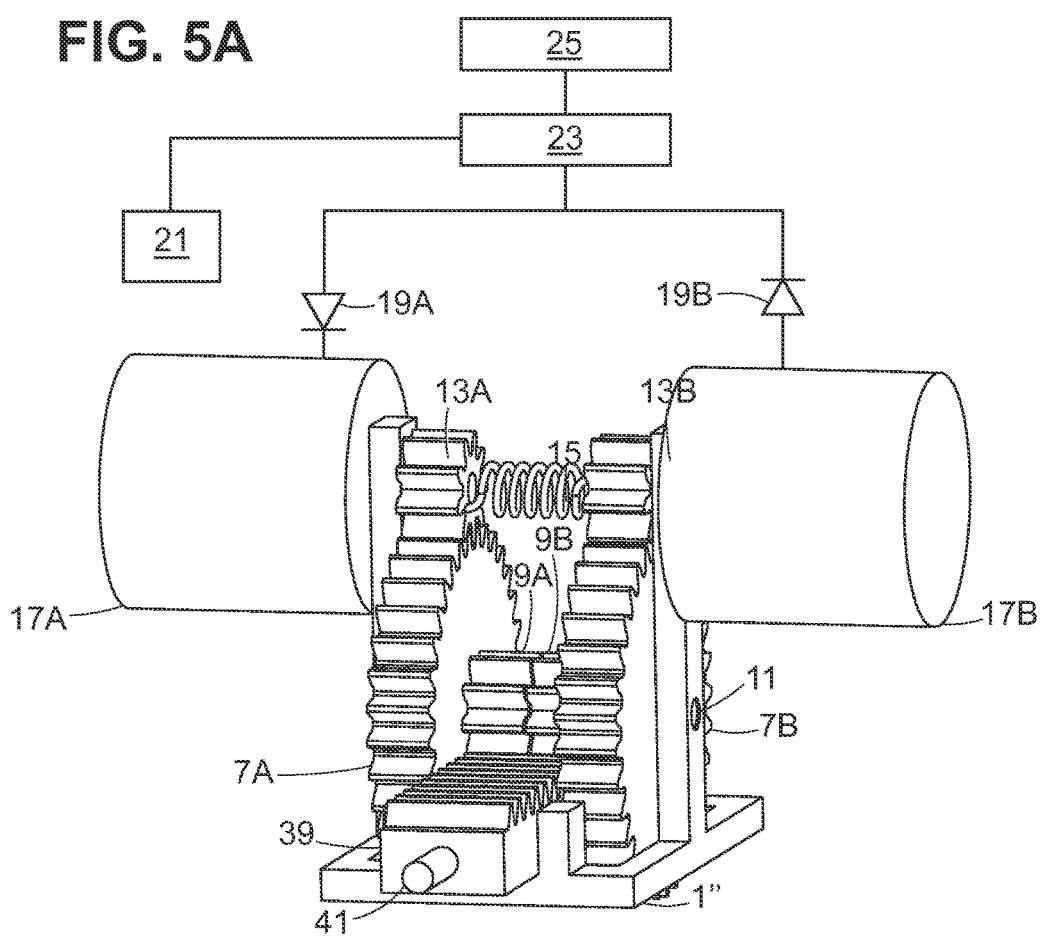
FIG. 5A is a schematic perspective view of a third embodiment having a linear output.

Referring to FIGS. 5A, 5B, 5C, 5D, and 5E, a third exemplary embodiment will now be described. The drive system illustrated in FIG. 5A comprises a support structure 1", an output in the form of an output shaft 41, motors 17A and 17B, an elastic element in the form of a spring 15, two transmissions coupling the motors to rack 39, diodes 19A and 9B, a motor controller 23, a power source 25, and a position sensor 21. Motors 17A and 17B both comprise a stator and a rotor. The stator of each motor includes a housing fixed to support structure 1", while the rotor of each motor includes a rotating shaft which extends from the housing. The first transmission comprises a pinion gear 13A, a spur gear 7A, and a pinion gear 9A, and a rack 39. The second transmission comprises a pinion gear 13B, a spur gear 7B, a pinion gear 9B, and rack 39 (which is part of both transmissions). Spur gears 7A and 7B freely rotate on a shaft 11. One end of spring 15 is fixed to pinion 13A, while the other end of spring 15 is fixed to pinion 13B. In this embodiment, spring 15 is a torsion spring that is preloaded or "wound up" to exert a torque on pinion 13A (and hence the rotor of motor 17A) as well as a torque equal in magnitude, though opposite in direction, on pinion 13B (and hence the rotor of motor 17B). Pinion 13A is preloaded by spring 15 to rotate counterclockwise to press against spur gear 7A, as shown in FIGS. 5C and 5D. As a result, spur gear 7A is preloaded to rotate clockwise by spring 15. Pinion gear 9A is fixed to spur gear 7A. Therefore, as spur gear 7A rotates clockwise, pinion gear 9A also rotates clockwise to press against rack 41, as shown in FIG. 5E, urging rack 41 toward the left in FIGS. 5C and 5E. Spring 15 therefore acts to remove the backlash from the first transmission when the first transmission drives the output shaft 41 toward the left (in FIG. 5C). For example, if the rotor of motor 17A turns counterclockwise, pinion gear 13A is already in contact with spur gear 7A, so there is no backlash as long as pinion gear 13A turns counterclockwise. Similarly, pinion gear 9A is already in contact with rack 39, so there is no backlash as long as pinion gear 9A turns clockwise. Therefore, in the first transmission, any backlash has been taken up by spring 15 as long as the rotor of motor 17A turns counterclockwise. Pinion gear 13B, spur gear 7B, and pinion gear 9B similarly carry a preload from spring 15, but in the reverse direction, urging rack 39 to toward the right (in FIG. 5C) in the opposite direction that pinion gear 13A, spur gear 7A, and pinion gear 9A are urging it to move. Therefore, in the second transmission, any backlash has been taken up by spring 15 as long as the rotor of motor 17B turns in the opposite direction of the rotor of motor 17A, or clockwise relative to FIG. 5C.

As shown in FIG. 5A, diode 19A has its anode or positive terminal coupled to a circuit that also connects to motor controller 23 and the cathode or negative terminal of diode 19B. The cathode or negative terminal of diode 19A is coupled to motor 17A, while the anode or positive terminal of diode 19B is coupled to motor 17B. Therefore, when a positive electrical current flows from motor controller 23 into the circuit, it is directed into motor 17A. Likewise, when a negative electrical current flows from motor controller 23 into the circuit, it is directed into motor 17B. Motor 17A is configured in such a way that a positive electrical current flowing into motor 17A will cause the rotor of motor 17A (and thus pinion 13A) to turn counterclockwise (in FIG. 5C). Similarly, motor 17B is configured in such a way that a negative electrical current flowing into motor 17B will cause the rotor of motor 17B (and thus pinion 13B) to turn clockwise (relative to FIG. 5C). Therefore, when current from motor controller 23 is flowing in the positive direction, the rotor of motor 17A turns pinion 13A counterclockwise (relative to FIG. 5C) while motor 17B receives approximately no current due to the diodes 19A and 19B. As described earlier, when pinion 13A turns counterclockwise (relative to FIG. 5C), backlash between pinion gear 13A and spur gear 17A, as well as between pinion gear 9A and rack 39, was taken up by spring 15, so no backlash is present as pinion 13A causes output rack 39 (and hence output shaft 5) to move toward the left (relative to FIG. 5C). Similarly, when the current from motor controller 23 is flowing in the opposite (negative) direction, the rotor of motor 17B turns pinion 13B clockwise (relative to FIG. 5C) while motor 17A receives approximately no current, again due to diodes 19A and 19B. As described earlier, when pinion 13B turns clockwise (relative to FIG. 3C), backlash between pinion gear 13B and spur gear 17B, as well as between pinion gear 9B and rack 39, was taken up by spring 15, so no backlash is present as pinion 13B causes rack 39 and hence shaft 41 to move toward the right (relative to FIG. 5C).

Motor controller 23 comprises a motor amplifier that varies the amount of power delivered to motors 17A and 17B, while position sensor 21 tracks the position of output shaft 5. Power source 25 supplies power to motor controller 23. In some embodiments, position sensor 21 may be used to provide a position signal to motor controller 23, which may use the position signal in a closed-loop control system for maintaining or moving output shaft 41 to a particular position. In other embodiments, motor controller 23 may use the current delivered to motors 17A and 17B in a closed-loop force control system for maintaining or moving output shaft 41 with a particular force.

A Fourth Exemplary Embodiment

Figure 6A:
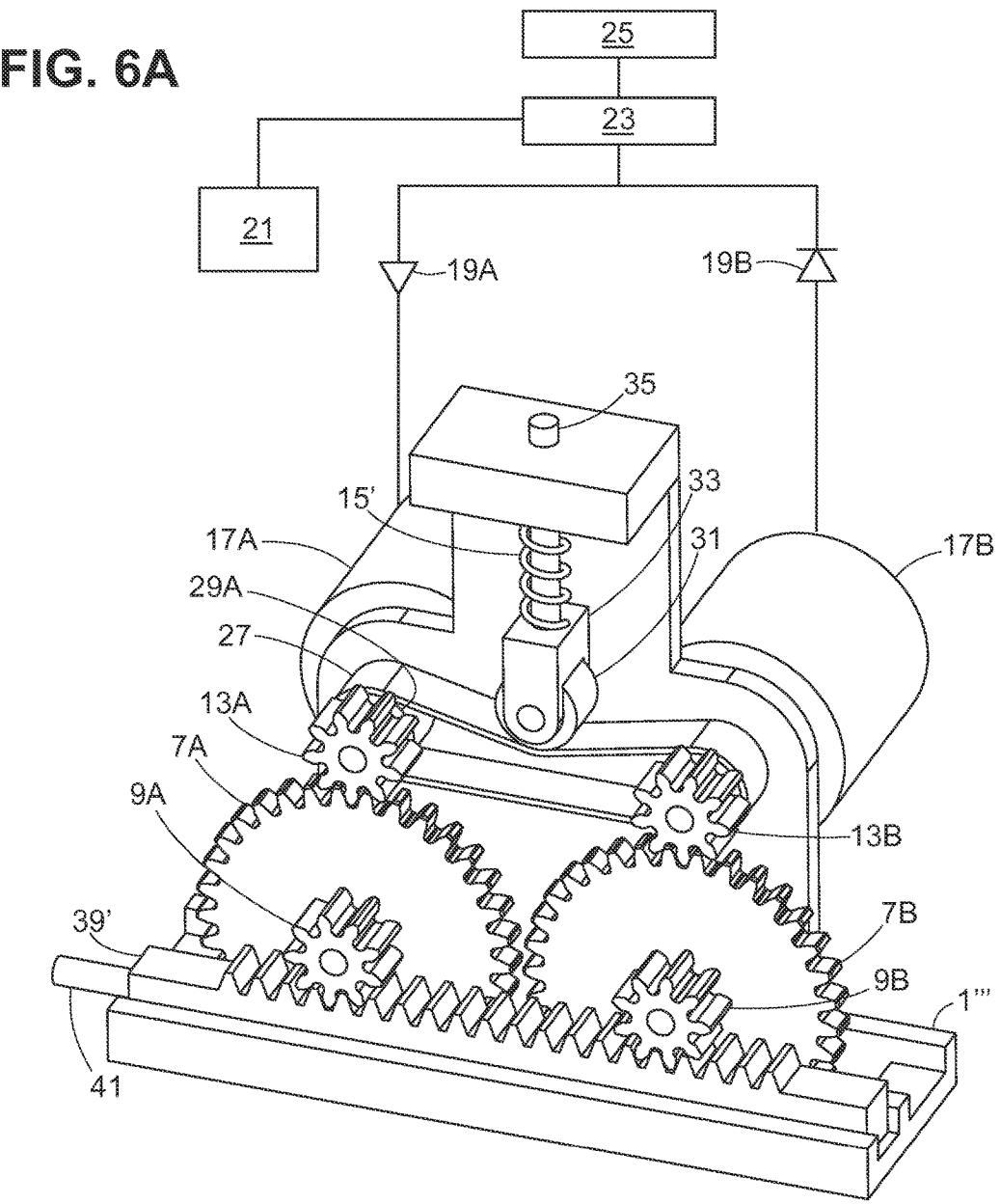
FIG. 6A is a schematic perspective view of a fourth embodiment having a linear output.

Referring to FIGS. 6A, 6B, 6C, 6D, 6E, and 6F, a fourth exemplary embodiment will now be described. The drive system illustrated in FIG. 6A comprises a support structure Y''', an output in the form of output shaft 41, motors 17A' and 17B', two transmissions coupling the motors to output shaft 41, a preloading mechanism for preloading the two transmissions, diodes 19A and 9B, motor controller 23, power source 25, and position sensor 21. Motors 17A' and 17B' both comprise a stator and a rotor. The stator of each motor includes a housing fixed to support structure 1''', while the rotor of each motor includes a rotating shaft which extends from the housing. The first transmission comprises pinion gear 13A, spur gear 7A, pinion gear 9A, and rack 39'. The second transmission comprises pinion gear 13B, spur gear 7B, pinion gear 9B, and rack 39' (which is part of both transmissions). Spur gears 7A and 7B freely rotate on a shaft 11. The preloading mechanism comprises timing pulleys 29A and 29B (visible in FIG. 6B), timing belt 27, wheel 31, wheel support 33, shaft 35, and an elastic element in the form of spring 15'. Timing pulley 29A is fixed to pinion gear 13A, while timing pulley 29B is fixed to pinion gear 13B. Timing belt 27 meshes with timing pulleys 29A and 29B. Spring 15' and wheel 31 is supported by shaft 35 via wheel support 33. Spring 15' is a compression spring that presses wheel 31 against timing belt 27 via wheel support 33. Referring to FIG. 6B, as wheel 31 is pressed against timing belt 27, timing belt 27 causes timing pulley 29A to rotate clockwise. Since pinion gear 13A is fixed to pulley 29A, gear 13A also rotates clockwise, pressing against spur gear 7A as shown in FIG. 6C, which causes spur gear 7A to rotate counterclockwise. Since pinion gear 9A is fixed to spur gear 7A, it too is caused to rotate counterclockwise. Pinion gear 9A in turn urges rack 39' to move to the right, as shown in FIGS. 6B and 6E. Similarly, as wheel 31 is pressed against timing belt 27, timing belt 27 causes timing pulley 29B to rotate counterclockwise. Since pinion gear 13B is fixed to pulley 29B, gear 13B also rotates counterclockwise, pressing against spur gear 7B as shown in FIG. 6D, which causes spur gear 7B to rotate clockwise. Since pinion gear 9B is fixed to spur gear 7B, it too is caused to rotate clockwise. Pinion gear 9B in turn urges rack 39' to move to the left, as shown in FIGS. 6B and 6F. The preloading mechanism therefore removes the backlash between pinion gear 13A and spur gear 7 A, the backlash between pinion gear 9A and output spur gear 37, the backlash between pinion gear 13B and spur gear 7B, and the backlash between pinion gear 9B and output spur gear 37.

As shown in FIG. 6A, diode 19A has its anode or positive terminal coupled to a circuit that also connects to motor controller 23 and the cathode or negative terminal of diode 19B. The cathode or negative terminal of diode 19A is coupled to motor 17A', while the anode or positive terminal of diode 19B is coupled to motor 17B'. Therefore, when a positive electrical current flows from motor controller 23 into the circuit, it is directed into motor 17A'. Likewise, when a negative electrical current flows from motor controller 23 into the circuit, it is directed into motor 17B'. Motor 17A' is configured in such a way that a positive electrical current flowing into motor 17A' will cause the rotor of motor 17A' (and thus pinion 13A) to turn clockwise (in FIG. 6B). Similarly, motor 17B' is configured in such a way that a negative electrical current flowing into motor 17B' will cause the rotor of motor 17B' (and thus pinion 13B) to turn counterclockwise (relative to FIG. 6B). Therefore, when current from motor controller 23 is flowing in the positive direction, the rotor of motor 17A' turns pinion 13A clockwise (relative to FIG. 6B) while motor 17B' receives approximately no current due to the diodes 19A and 19B. As described earlier, when pinion 13A turns clockwise (relative to FIG. 6B), backlash between pinion gear 13A and spur gear 7A, as well as between pinion gear 9A and output spur gear 3, was taken up by spring 15' pressing tensioning wheel 31 on timing belt 27, so no backlash is present as pinion 13A causes rack 39' (and hence output shaft 5') to move toward the right (relative to FIG. 6B). Similarly, when the current from motor controller 23 is flowing in the opposite (negative) direction, the rotor of motor 17B' turns pinion 13B counterclockwise (relative to FIG. 6B) while motor 17A' receives approximately no current, again due to diodes 19A and 19B. As described earlier, when pinion 13B turns counterclockwise (relative to FIG. 6B), backlash between pinion gear 13B and spur gear 7B, as well as between pinion gear 9B and rack 39', was taken up by spring 15', so no backlash is present as pinion 13B causes rack 39' (and hence output shaft 5) to move to the left (relative to FIG. 6B).

Motor controller 23 comprises a motor amplifier that varies the amount of power delivered to motors 17A and 17B, while position sensor 21 tracks the position of output shaft 5. Power source 25 supplies power to motor controller 23.

A Fifth Exemplary Embodiment

Figure 7A:
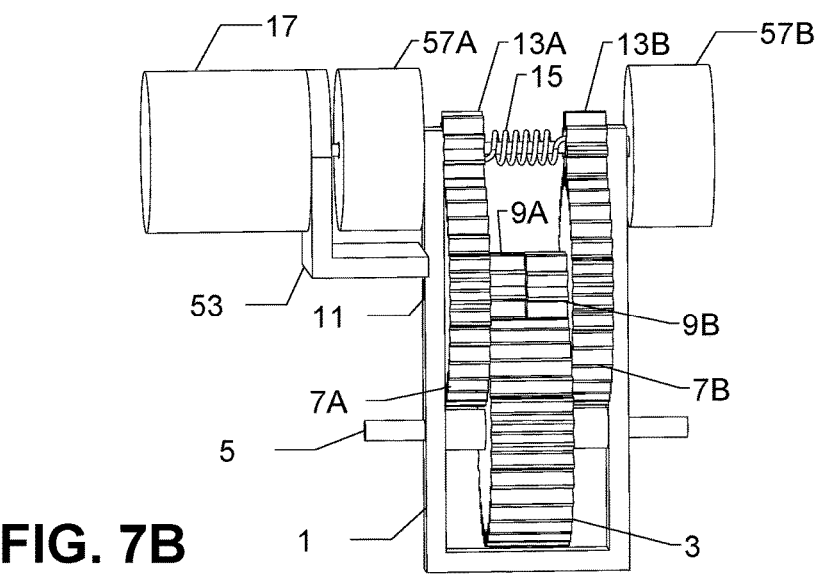
FIG. 7A is a perspective view of an embodiment incorporating two controllable dampers so as to require only one motor.
Figure 7B:
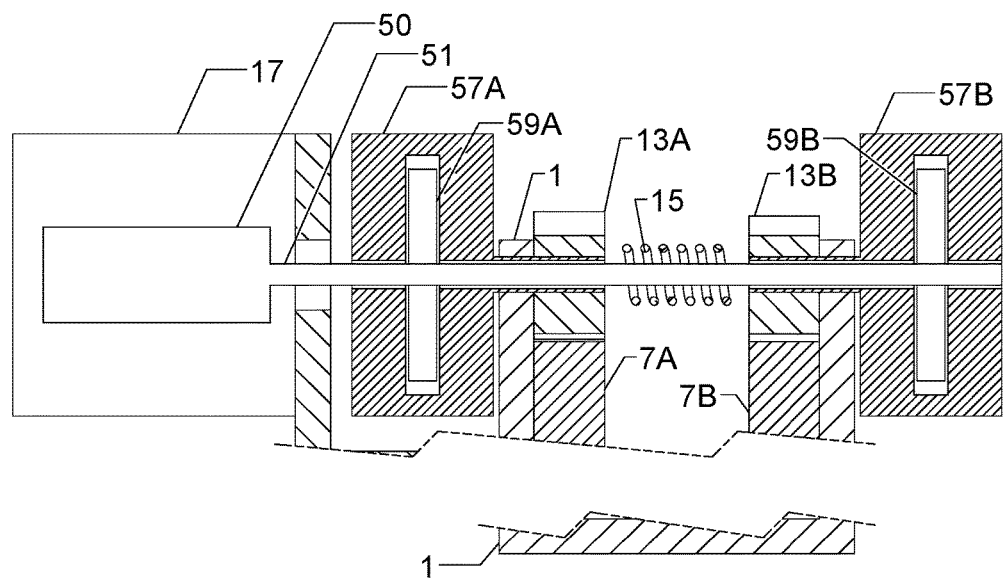
FIG. 7B is a cross-sectional view of the embodiment of FIG. 7A, with a cut to save space.

FIG. 7A shows a perspective view of another embodiment, a drive system for minimizing backlash incorporating two dampers so as to require only one motor (instead of two motors as in previous embodiments). The drive system of FIG. 7A comprises support structure 1, a motor 17, output element 5, a first controllable damper 57A, a second controllable damper 57B, a first transmission comprising pinion gear 13A, spur gear 7A, pinon gear 9A, and spur gear 3, a second transmission comprising pinion gear 13B, spur gear 7B, pinion gear 9B, and spur gear 3, and elastic element 15 (in this embodiment, spring 15 as in the embodiment of FIG. 3A). FIG. 7B shows a cross-sectional view of the embodiment of FIG. 7A, with a cut so as to show only the upper portion of assembly (the portion that differs from the embodiment of FIG. 3A). As shown in FIG. 7B, motor 17 comprises a first stator (the outer housing of motor 17) and a first rotor 50, the first stator of motor 17 being coupled to support structure 1. The output element 5 (output shaft 5 in this particular embodiment) is coupled to support structure 1 such that output element 5 can move (in this particular embodiment, rotate) relative to support structure 1. The first controllable damper 57A comprises a first portion 59A and a second portion (the portion of controllable damper 57A comprising the housing or stator), the first portion 59A being coupled to the first rotor 50 via a shaft 51. The second controllable damper 57B comprises a third portion 59B and a fourth portion (the portion of controllable damper 57B comprising the housing or stator), the third portion 59B being coupled to the first rotor 50 via shaft 51. A suitable type of controllable damper for the first and second controllable dampers 57A and 57B is a magnetorheological damper, such as is described in U.S. Pat. No. 6,764,520B2, the entire disclosure of which is hereby incorporated by reference herein. The first transmission is coupled between the second portion of the first controllable damper 57A and output element 5. The second transmission is coupled between the fourth portion of the second controllable damper 57B and output element 5. Elastic element 15 is coupled between the second portion of the first controllable damper 57A and the fourth portion of the second controllable damper 57B (note the tubular portion extending toward the right from first controllable damper 57A to couple to pinion gear 13A, and a similar tubular portion extending toward the left from second controllable damper 57B to couple to pinion gear 13B).

Elastic element 15 is preloaded to apply a first torque to the second portion of the first controllable damper 57A and a second torque to the fourth portion of the second controllable damper 57B. The second torque is equal to the first torque in magnitude but opposite in direction. The first torque applies a third torque to the output element through the first transmission (comprising pinion gear 13A, compound gear 9A, and spur gear 3 in this embodiment), the second torque applies a fourth torque to the output element through the second transmission (comprising pinion gear 13B, compound gear 9B, and spur gear 3 in this embodiment). The fourth torque is approximately equal to the third torque in magnitude but opposite in direction.

The drive system of FIGS. 7A and 7B further comprises the same circuitry as shown in FIG. 3A and described above, with the only differences being that 1) diode 19A is connected to controllable damper 57A instead of motor 17A, 2) diode 19B is connected to controllable damper 57B instead of motor 17B, and motor 17 is connected to motor amplifier 23 in parallel with the diodes 19A and 19B. Thus, in operation, when current flows in a first direction, motor 17 turns in a first direction, with controllable damper 57A on and controllable damper 57B off. As in the embodiment shown in FIG. 3A, the first transmission has all gears already engaged with each other (due to spring 15) and thus motion is transmitted to output 5 substantially without backlash. When current flows in a second direction (opposite the first direction), motor 17 turns in a second direction (opposite the first direction) with controllable damper 57A off and controllable damper 57B on. As in the embodiment shown in FIG. 3A, the second transmission has all gears already engaged with each other (due to spring 15) and thus motion is transmitted to output 5 substantially without backlash.

According to another aspect, the drive system further comprises a single amplifier coupled to the circuit for supplying a controllable amount of power to the circuit, whereby the first controllable damper, the second controllable damper, and motor 17 are powered by the single amplifier.

In some embodiments, controllable dampers 57A and 57B may be controlled without using the circuit of FIG. 3A. For example, they could be directly controlled via a computer or microcontroller. This allows additional functionality, such as being able to turn both dampers off to minimize the effort required to rotate output 5 by disconnecting motor 17.

Several example embodiments according to the present invention have been described. These example embodiments do not represent the full scope of the invention. Other embodiments, including those incorporating equivalent assemblies and components to those illustrated and described, will become apparent to those skilled in the art. It is intended that the full scope of the invention, which is defined by the claims, encompasses any and all such embodiments.

What is claimed:

1. A drive system for minimizing backlash comprising:
   a) a support structure;
   b) a first motor, the first motor comprising a first stator and a first rotor, the first stator of the first motor coupled to the support structure;
   c) a second motor, the second motor comprising a second stator and a second rotor, the second stator of the second motor coupled to the support structure;
   d) an output element coupled to the support structure such that the output element can move relative to the support structure;
   e) a first transmission coupled between the first rotor of the first motor and the output element;
   f) a second transmission coupled between the second rotor of the second motor and the output element; and
   g) an elastic element coupled between the first rotor of the first motor and the second rotor of the second motor.

2. The drive system of claim 1, wherein the elastic element is preloaded to apply a first torque to the first rotor of the first motor and a second torque to the second rotor of the second motor, the second torque being equal to the first torque in magnitude but opposite in direction, the first torque applying a third torque to the output element through the first transmission, the second torque applying a fourth torque to the output element through the second transmission, the fourth torque being approximately equal to the third torque in magnitude but opposite in direction.

3. The drive system of claim 2, further comprising:
   a) A first diode having a first anode and a first cathode, the first cathode coupled to the first motor;
   b) A second diode having a second anode and a second cathode, the second anode coupled to the second motor; and
   c) A circuit coupling the first anode of the first diode and the second cathode of the second motor together.

4. The drive system of claim 3, further comprising a single motor amplifier coupled to the circuit for supplying a controllable amount of power to the circuit, whereby both the first motor and the second motor are powered by the single motor amplifier.

5. The drive system of claim 1, wherein the first transmission comprises a first gear coupled to the first rotor of the first motor and a second gear coupled to the output element, the first gear in mesh with the second gear.

6. The drive system of claim 1, wherein the first transmission comprises a first pulley coupled to the first rotor of the first motor, a second pulley coupled to the output element, and a belt coupled between the first pulley and the second pulley for transmitting torque between them.

7. The drive system of claim 1, wherein the first transmission comprises a first sprocket, coupled to the first rotor of the first motor, a second sprocket coupled to the output element, and a chain coupled between the first sprocket and the second sprocket for transmitting torque between them.

8. The drive system of claim 1, wherein the output element comprises a shaft.

9. The drive system of claim 1, wherein the elastic element comprises a spring.

10. A drive system for minimizing backlash comprising:
    a) a support structure;
    b) a motor comprising a first stator and a first rotor, the first stator of the motor coupled to the support structure;
    c) an output element coupled to the support structure such that the output element can move relative to the support structure;
    d) a first controllable damper comprising a first portion and a second portion, the first portion coupled to the first rotor;
    e) a second controllable damper comprising a third portion and a fourth portion, the third portion coupled to the first rotor;
    f) a first transmission coupled between the second portion of the first controllable damper and the output element;
    g) a second transmission coupled between the fourth portion of the second controllable damper and the output element; and
    h) an elastic element coupled between the second portion of the first controllable damper and the fourth portion of the second controllable damper.

11. The drive system of claim 10, wherein the elastic element is preloaded to apply a first torque to the second portion of the first controllable damper and a second torque to the fourth portion of the second controllable damper, the second torque being equal to the first torque in magnitude but opposite in direction, the first torque applying a third torque to the output element through the first transmission, the second torque applying a fourth torque to the output element through the second transmission, the fourth torque being approximately equal to the third torque in magnitude but opposite in direction.

12. The drive system of claim 11, further comprising:
    a) A first diode having a first anode and a first cathode, the first cathode coupled to the first controllable damper;
    b) A second diode having a second anode and a second cathode, the second anode coupled to the second controllable damper; and
    c) A circuit coupling the first anode of the first diode and the second cathode of the second diode together.

13. The drive system of claim 12, further comprising a single amplifier coupled to the circuit for supplying a controllable amount of power to the circuit, whereby the first controllable damper, the second controllable damper, and the first motor are powered by the single amplifier.

* * * * *